United States Patent
Onishi et al.

(10) Patent No.: US 12,225,447 B2
(45) Date of Patent: Feb. 11, 2025

(54) DATA COLLECTION SYSTEM, DATA OUTPUT APPARATUS, AND DATA COLLECTION METHOD

(71) Applicant: NEC Corporation, Tokyo (JP)

(72) Inventors: Yasuharu Onishi, Tokyo (JP); Yasuyuki Fukuta, Tokyo (JP); Sae Watanabe, Tokyo (JP); Noboru Tashiro, Tokyo (JP); Michio Shibata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 448 days.

(21) Appl. No.: 17/628,336

(22) PCT Filed: Jul. 8, 2020

(86) PCT No.: PCT/JP2020/026637
§ 371 (c)(1),
(2) Date: Jan. 19, 2022

(87) PCT Pub. No.: WO2021/020051
PCT Pub. Date: Feb. 4, 2021

(65) Prior Publication Data
US 2022/0286941 A1    Sep. 8, 2022

(30) Foreign Application Priority Data

Jul. 30, 2019 (JP) .................. 2019-139341

(51) Int. Cl.
*H04W 24/02* (2009.01)
*H04W 24/08* (2009.01)
*H04W 40/28* (2009.01)

(52) U.S. Cl.
CPC ........... *H04W 40/28* (2013.01); *H04W 24/08* (2013.01)

(58) Field of Classification Search
CPC ....... H04W 24/02; H04W 84/18; H04W 4/38; H04W 72/0453; H04L 67/12
See application file for complete search history.

(56) References Cited

U.S. PATENT DOCUMENTS 10,165,531 B1 * 12/2018 Behera ............... H04W 56/001
2007/0280192 A1   12/2007 Yagyu et al.
(Continued)

FOREIGN PATENT DOCUMENTS

JP    H10-190734 A    7/1998
JP    2005-252563 A   9/2005
(Continued)

OTHER PUBLICATIONS

Taiwanese Office Action for TW Application No. 109123535 mailed on Mar. 24, 2022 with English Translation.
(Continued)

*Primary Examiner* — Anez C Ebrahim
(74) *Attorney, Agent, or Firm* — Sughrue Mion, PLLC

(57) ABSTRACT

A plurality of data output apparatuses (10) are installed at places different from each other, and each output data in wireless communication. A data storage apparatus (20) stores the data output from the data output apparatus (10). The data output apparatus (10) includes at least one sensor and a wireless communication apparatus. The wireless communication apparatus stores, for each of the plurality of other wireless communication apparatuses that can be a transmission destination of the data, connection information for connecting to the other wireless communication apparatus and priority information indicating a priority of the other wireless communication apparatus. Then, the wireless communication apparatus repeats processing of reading the connection information, and performing communication by using the read connection information in descending order (Continued)

of the priority until the communication succeeds when a transmission route of the data is set.

13 Claims, 10 Drawing Sheets

(56) References Cited

U.S. PATENT DOCUMENTS

| | | | |
|---|---|---|---|
| 2012/0202506 A1 | 8/2012 | Schloemer | |
| 2012/0256492 A1 | 10/2012 | Song et al. | |
| 2013/0010621 A1 | 1/2013 | Yoshiuchi et al. | |
| 2013/0301415 A1 | 11/2013 | Archer et al. | |
| 2014/0376359 A1 | 12/2014 | Nishikata et al. | |
| 2017/0184470 A1 | 6/2017 | Rice et al. | |
| 2017/0341777 A1* | 11/2017 | Kumar | H04W 84/12 |

FOREIGN PATENT DOCUMENTS

| | | |
|---|---|---|
| JP | 2011-166807 A | 8/2011 |
| JP | 2013-021689 A | 1/2013 |
| JP | 2013-179451 A | 9/2013 |
| JP | 2018-006793 A | 1/2018 |
| WO | 2013/133211 A1 | 9/2013 |
| WO | 2015/015562 A1 | 2/2015 |

OTHER PUBLICATIONS

International Search Report for PCT Application No. PCT/JP2020/026637, mailed on Oct. 6, 2020.

* cited by examiner

| APPARATUS ID | CONNECTION INFORMATION | PRIORITY INFORMATION |
|---|---|---|
| 1 | ... | 3 |
| 2 | ... | 1 |
| 3 | ... | 2 |

DATA COLLECTION SYSTEM, DATA OUTPUT APPARATUS, AND DATA COLLECTION METHOD

This application is a National Stage Entry of PCT/JP2020/026637 filed on Jul. 8, 2020, which claims priority from Japanese Patent Application 2019-139341 filed on Jul. 30, 2019, the contents of all of which are incorporated herein by reference, in their entirety.

TECHNICAL FIELD

The present invention relates to a data collection system, a data output apparatus, and a data collection method.

BACKGROUND ART

Monitoring is performed by attaching a sensor to a monitoring target and collecting an output of the sensor. For example, PTL 1 describes that data are collected by causing multiple sensor terminals to perform multi-hop communication. In PTL 1, when the sensor terminal receives a polling packet at a time of data being collected, the sensor terminal broadcasts information related to its own terminal toward another center terminal around its own terminal. Further, the sensor terminal transmits, as a response to polling, the information related to its own terminal and information received from the other terminal to a server.

RELATED DOCUMENT

Patent Document

[PTL 1] International Publication No. WO2015/015562

SUMMARY OF THE INVENTION

Technical Problem to be Solved

When broadcast is performed as described in PTL 1 in a case where data are collected by multi-hop, susceptibility to an occurrence of trouble is reduced, but a communication amount required for collecting data increases. An object of the present invention is to be capable of collecting data even at an occurrence of trouble, and is to also reduce a communication amount at a time of data collection, when the data are collected by multi-hop.

Solution to Problem

The present invention provides a data collection system including:
a plurality of data output apparatuses that are installed at places different from each other, and each output data in wireless communication; and
a data storage apparatus that stores the data output from the plurality of data output apparatuses, in which
each of the plurality of data output apparatuses includes
at least one sensor that generates the data, and
a wireless communication apparatus that transmits the data toward the data storage apparatus, and
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and performing communication by using the read connection information in descending order of the priority until the communication succeeds when a transmission route of the data is set.

The present invention provides a data output apparatus that outputs data in wireless communication, and is used in a state of a plurality of the data output apparatuses being installed at places different from each other, the data output apparatus including:
at least one sensor that generates the data; and
a wireless communication apparatus that transmits the data toward a data storage apparatus, in which
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and performing communication by using the read connection information in descending order of the priority until the communication succeeds when a transmission route of the data is set.

The present invention provides a data collection method including using a data collection system, the data collection system including:
a plurality of data output apparatuses that are installed at places different from each other, and each output data in wireless communication, and
a data storage apparatus that stores the data output from the plurality of data output apparatuses, in which
each of the plurality of data output apparatuses includes
at least one sensor that generates the data, and
a wireless communication apparatus that transmits the data toward the data storage apparatus, and
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and performing communication by using the read connection information in descending order of the priority until the communication succeeds when a transmission route of the data is set.

Advantageous Effects of Invention

The present invention is capable of collecting data even at an occurrence of trouble, and also reducing a communication amount at a time of data collection, when the data are collected by multi-hop.

BRIEF DESCRIPTION OF THE DRAWINGS

FIG. 5 is a diagram illustrating one example of a data configuration of a priority information storage unit.

DESCRIPTION OF EMBODIMENTS

Hereinafter, example embodiments of the present invention will be described with reference to the drawings. Note that, in all of the drawings, a similar component has a similar reference sign, and description thereof will be appropriately omitted.

First Example Embodiment

Figure 1:
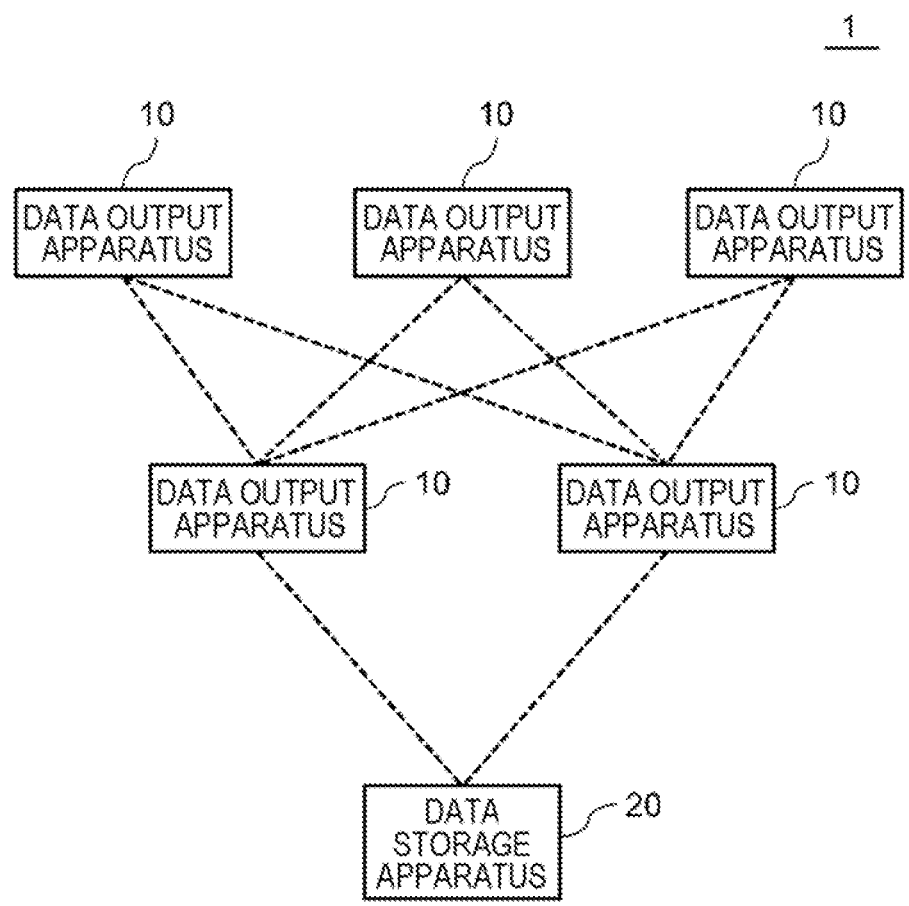
FIG. 1 is a diagram illustrating one example of a configuration of a data collection system according to a first example embodiment.

FIG. 1 is a diagram illustrating one example of a configuration of a data collection system 1 according to the present example embodiment. The data collection system 1 includes a plurality of data output apparatuses 10 and a data storage apparatus 20. The data output apparatus 10 includes a sensor (a sensor 100 illustrated in FIG. 2), and outputs, toward the data storage apparatus 20, data generated by the sensor together with information (hereinafter described as sensor identification information) identifier that identifies the sensor from another sensor. At this time, the plurality of data output apparatuses 10 transmit data and the sensor identification information to the data storage apparatus 20 by performing multi-hop communication. The data storage apparatus 20 is, for example, a server, and stores, in association with each other, the data and the sensor identification information being transmitted from the data output apparatus 10.

The plurality of data output apparatuses 10 are installed at the same site (for example, at a site of a factory and a site of a power plant). Then, the sensor included in the data output apparatus 10 generates data indicating a state of a facility located at the site. An example of the facility is, for example, a conveying apparatus that conveys raw materials and semimanufactured goods, such as a belt conveyor, and the facility may be another apparatus, for example, a blast furnace, a converter, and a rolling line of an ironworks, or may be at least one of facilities constituting a plant at a chemical factory and various power generation apparatuses. Then, the plurality of data output apparatuses 10 may be installed in the same facility, or at least one of the data output apparatuses 10 may be installed in a facility different from that of the other data output apparatuses 10.

Note that, communication is performed in wireless communication between the plurality of data output apparatuses 10, but communication using a cable may be performed between at least a part of the data output apparatuses 10. Further, the data output apparatus 10 that directly communicates with the data storage apparatus 20 may communicate with the data storage apparatus 20 via a cable.

Further, a band of wireless communication performed between the plurality of data output apparatuses 10 and a band of wireless communication performed between the data output apparatus 10 and the data storage apparatus 20 may be the same, or at least one band may be different from the other band. For example, a band of wireless communication performed at a place relatively close to the data storage apparatus 20 may be on a higher frequency side than that of the other band. An amount of data to be communicated increases at a place relatively closer to the data storage apparatus 20. Thus, the configuration described above can secure a communication velocity. Further, a possibility of a poor communication environment increases at a place farther away from the data storage apparatus 20. Thus, the configuration described above decreases a possibility that communication cannot also be performed at a place farther away from the data storage apparatus 20.

Note that, when a band of communication in any wireless communication is different, a band in a wireless communication when data are received and a band in wireless communication when the data are transmitted are different in the data output apparatus 10 located at a boundary of the different band. For example, a band in the wireless communication when data are received is on a lower frequency side than that of a band in the wireless communication when the data are transmitted.

Figure 2:
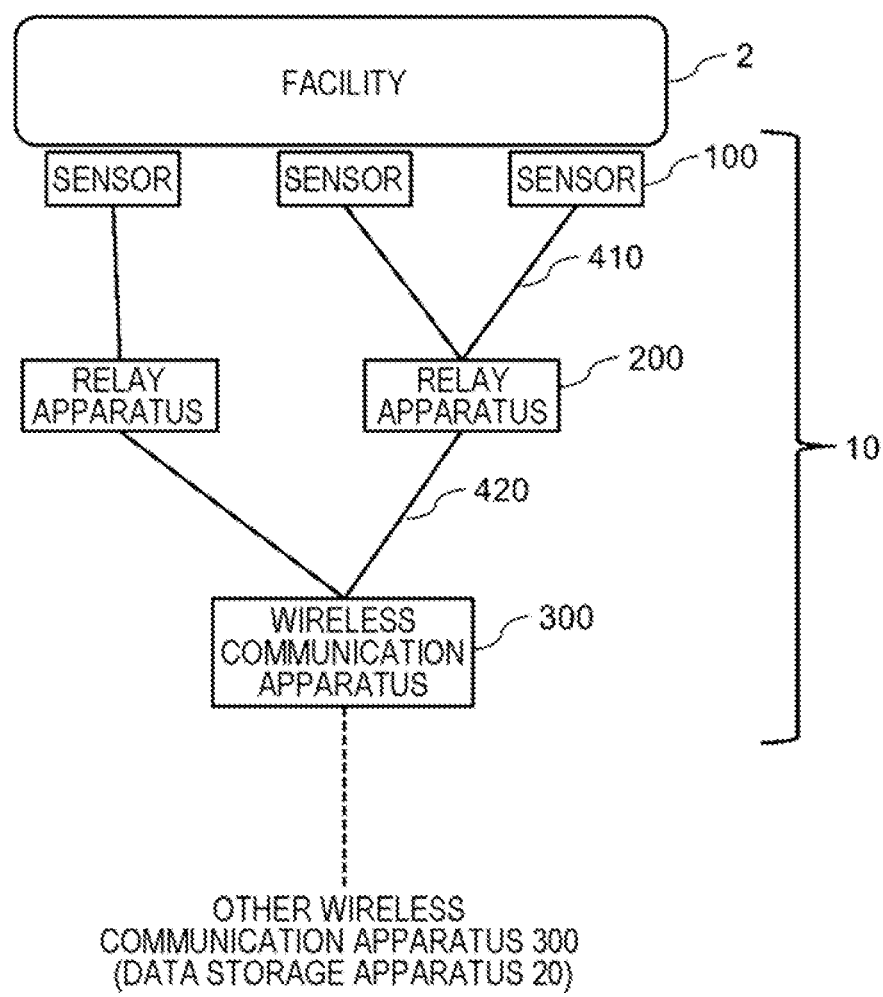
FIG. 2 is a diagram illustrating one example of a configuration of a data output apparatus.

FIG. 2 is a diagram illustrating one example of a configuration of the data output apparatus 10. The data output apparatus 10 includes at least one sensor 100, at least one relay apparatus 200, a wireless communication apparatus 300, at least one first cable 410, and at least one second cable 420. The first cable 410 connects the sensor 100 and the relay apparatus 200, and the second cable 420 connects the relay apparatus 200 and the wireless communication apparatus 300. The relay apparatus 200 processes data. In other words, the relay apparatus 200 receives data from the sensor 100 via the first cable 410, and processes the received data. Then, the wireless communication apparatus 300 receives the data processed by the relay apparatus 200 from the relay apparatus 200 via the second cable 420.

In the example illustrated in FIG. 2, the data output apparatus 10 includes the plurality of sensors 100, and also includes the plurality of relay apparatuses 200. The plurality of relay apparatuses 200 are connected to the wireless communication apparatus 300 by the second cables 420 different from each other. Further, the plurality of sensors 100 are connected to at least one relay apparatus 200 by the first cables 410 different from each other.

Herein, the second cable 420 may include a power line. In this case, the relay apparatus 200 is supplied with power from the wireless communication apparatus 300. Further, the first cable 410 may include a power line. In this case, the sensor 100 is supplied with power from the relay apparatus 200.

The plurality of sensors 100 are attached to a facility 2 to be monitored. When the facility 2 is a large-scale facility (for example, a long belt conveyor), the plurality of sensors 100 are installed at monitoring places of the facility 2 different from each other. In this case, the plurality of sensors 100 are sensors that detect the same physical quantity. As one example, the sensor 100 is a vibration sensor. The vibration sensor may be a sensor that detects vibration in one direction, and may be a sensor that separately detects vibration in multiple directions (for example, an x-axis direction, a y-axis direction, and a z-axis direction). Note that, the plurality of sensors 100 that detect physical quantities different from each other may also be provided at one monitoring place. For example, when the facility 2 is a belt conveyor, the sensor 100 being a vibration sensor and the sensor 100 that detects a rotation rate of a roller constituting the belt conveyor may be provided at one monitoring place. Then, for example, the sensor 100 may output data in each predetermined period, or may output data when there is an instruction from the wireless communication apparatus 300.

Depending on a kind of the facility 2, the facility 2 (i.e., the sensor 100) and the wireless communication apparatus 300 may be located away from each other to extent in order to protect the wireless communication apparatus 300. In this case, a total value of lengths of the first cable 410 and the second cable 420 is, for example, equal to or more than 30 m and furthermore, equal to or more than 50 m. For example, a length of the first cable 410 is equal to or more than 10 m, and a length of the second cable 420 is, for example, equal to or more than 20 m. Then, the first cable 410 may also be set shorter than the second cable 420.

In a case where the sensor 100 and the wireless communication apparatus 300 need to be located away from each other, i.e., in a case where a total value of lengths of the first cable 410 and the second cable 420 increases, an S/N ratio of data output from the sensor 100 may deteriorate when the data reach the wireless communication apparatus 300. In order to suppress the deterioration, the relay apparatus 200 processes the data output from the sensor 100, and outputs the processed data to the wireless communication apparatus 300. In other words, by providing the relay apparatus 200, the sensor 100 and the wireless communication apparatus 300 can be located away from each other.

Further, the wireless communication apparatus 300 or the relay apparatus 200 controls an operation (for example, ON/OFF of detection or a data output) of the sensor 100. For example, the wireless communication apparatus 300 controls a length of data to be output as one piece of data from the sensor 100, i.e., a length of a measurement time. In this way, the wireless communication apparatus 300 can control a volume of data to be transmitted toward the data storage apparatus 20.

Further, the relay apparatus 200 outputs analog data or digital data. Then, the wireless communication apparatus 300 performs AD conversion or DD conversion on the data received from the relay apparatus 200. The wireless communication apparatus 300 can control a volume of data to be transmitted toward the data storage apparatus 20 by changing a sampling frequency at a time of the conversion. Note that, the relay apparatus 200 instead of the wireless communication apparatus 300 may perform the processing.

Further, when the sensor 100 is a multi-axial vibration sensor as described above, the sensor 100, the relay apparatus 200, or the wireless communication apparatus 300 can control a volume of data to be transmitted toward the data storage apparatus 20 by controlling the number of directions of vibration included in the data (for example, by determining whether to include all three axes, or by determining whether two axes or one axis).

Further, when a plurality of kinds of the sensors 100 are provided at one monitoring place as described above, the wireless communication apparatus 300 or the relay apparatus 200 can control a volume of data to be transmitted toward the data storage apparatus 20 by adjusting the number of the sensors 100 that need to transmit the data. In the processing, the relay apparatus 200 or the wireless communication apparatus 300 may control a volume of data by discarding the data, or may control a volume of data by increasing/decreasing the number of the sensors 100 to operate.

In the configuration described above, the sensor 100 outputs data generated by the sensor 100 together with sensor identification information about the sensor 100. The relay apparatus 200 and the wireless communication apparatus 300 output, in association with the sensor identification information, the data generated by the sensor 100. Note that, the relay apparatus 200 instead of the sensor 100 may associate the sensor identification information with the data.

Figure 3:
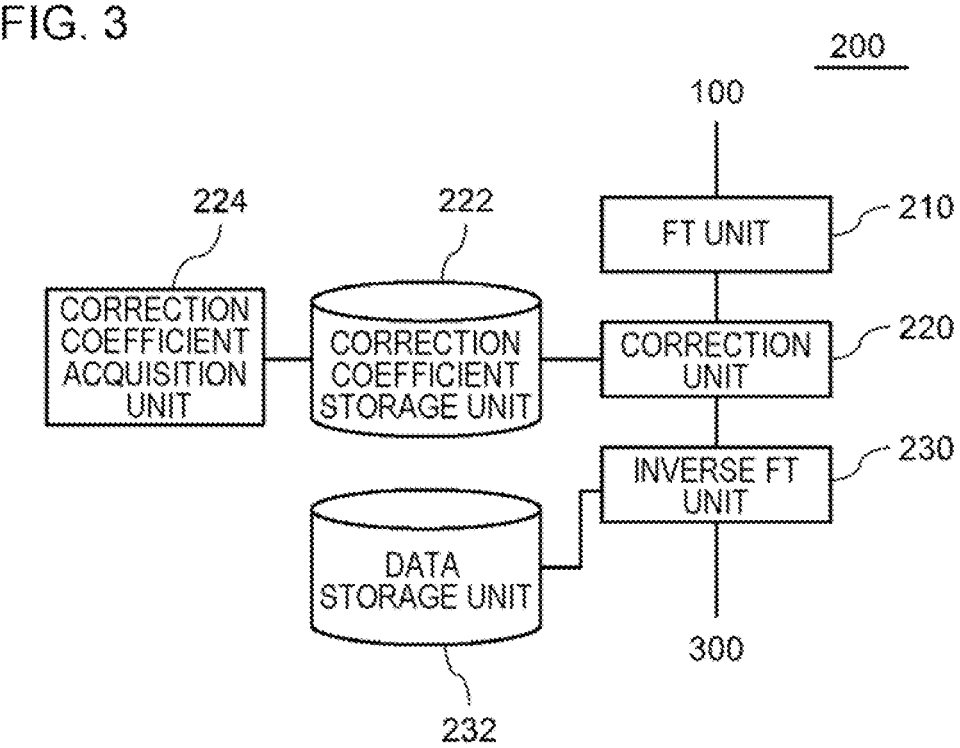
FIG. 3 is a diagram illustrating one example of a functional configuration of a relay apparatus.

FIG. 3 is a diagram illustrating one example of a functional configuration of the relay apparatus 200. In the example illustrated in FIG. 3, the relay apparatus 200 includes a Fourier transform unit 210, a correction unit 220, and an inverse Fourier transform unit 230. The Fourier transform unit 210 performs Fourier transform on data received from the sensor 100. The correction unit 220 corrects intensity of the data after the Fourier transform on a frequency band basis. The correction unit 220 is, for example, a digital filter, and performs the correction described above by multiplying the intensity by a correction coefficient on a band basis, for example. The inverse Fourier transform unit 230 performs inverse Fourier transform on the data after the intensity is corrected. Note that, the relay apparatus 200 may perform amplification processing of data.

The relay apparatus 200 further includes a correction coefficient storage unit 222 and a correction computation-week acquisition unit 224. The correction coefficient storage unit 222 stores a correction coefficient used for correction performed by the correction unit 220. The correction computation-week acquisition unit 224 acquires a correction coefficient input from a user, and stores the correction coefficient in the correction coefficient storage unit 222. In other words, a user can update a correction coefficient stored in the correction coefficient storage unit 222.

The relay apparatus 200 further includes a data storage unit 232. The data storage unit 232 stores data received from the sensor 100. The data storage unit 232 is provided for backing up data generated by the sensor 100. Thus, even when an abnormality occurs in the wireless communication apparatus 300 and data cannot be transmitted to the data storage apparatus 20 at a determined timing, the data can be acquired later from the data storage unit 232. The acquisition may be manually performed, or may be performed by transmission by the wireless communication apparatus 300 to the data storage apparatus 20 after the wireless communication apparatus 300 recovers.

In the example illustrated in FIG. 3, the data storage unit 232 stores data after the inverse Fourier transform unit 230 performs inverse Fourier transform, but may store data before the Fourier transform unit 210 performs Fourier transform.

Figure 4:
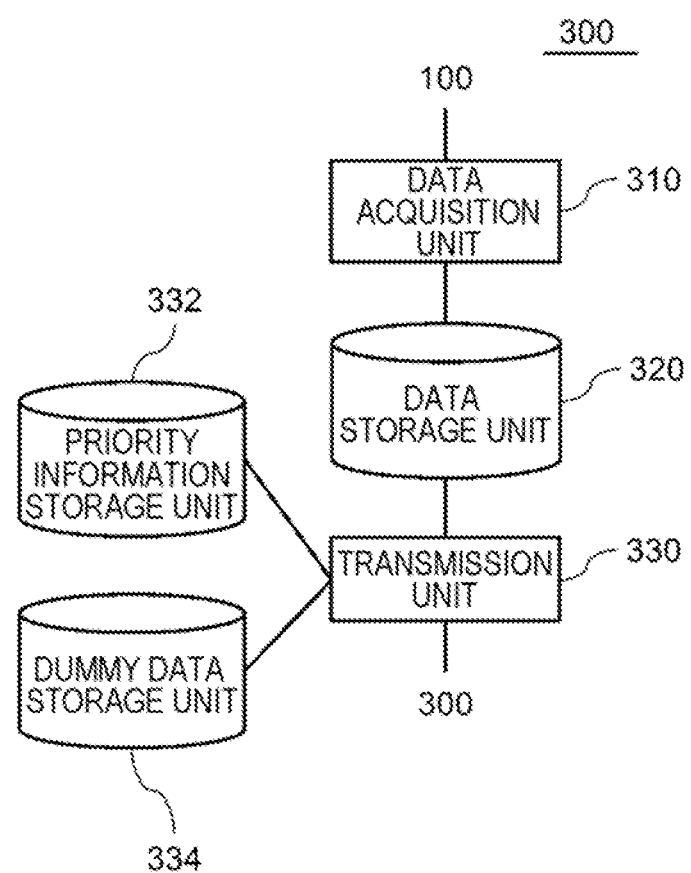
FIG. 4 is a diagram illustrating one example of a functional configuration of a wireless communication apparatus.

FIG. 4 is a diagram illustrating one example of a functional configuration of the wireless communication apparatus 300. The wireless communication apparatus 300 includes a data acquisition unit 310, a data storage unit 320, and a transmission unit 330. The data acquisition unit 310 acquires data and sensor identification information from the relay apparatus 200, and stores the acquired data and the acquired sensor identification information in the data storage unit 320. The data storage unit 320 may temporarily store data, or may store data in a nonvolatile manner. The transmission unit 330 transmits the data and the sensor identification information stored in the data storage unit 320 toward the data storage apparatus 20. The transmission unit 330 may transmit the data and the sensor identification information toward the data storage apparatus 20 immediately after the data acquisition unit 310 receives the data and the sensor identification information (real-time processing), or may transmit the data and the sensor identification information toward the data storage apparatus 20 in a batch manner.

The transmission unit 330 transmits the data and the sensor identification information toward the other wireless communication apparatus 300 closer to the data storage apparatus 20 than the wireless communication apparatus 300. Further, when the transmission unit 330 receives data from the other wireless communication apparatus 300, the transmission unit 330 also transmits the data to the other wireless communication apparatus 300 closer to the data storage apparatus 20 than the wireless communication apparatus 300. Herein, the transmission unit 330 transmits dummy data when the transmission unit 330 determines the wireless communication apparatus 300 being a transmission destination. Details of the processing will be described later by using a flowchart.

The wireless communication apparatus 300 further includes a priority information storage unit 332 and a dummy data storage unit 334. The priority information storage unit 332 and the dummy data storage unit 334 store data used for the multi-hop described above. Specifically, the dummy data storage unit 334 stores the dummy data described above, i.e., the data used for determining the wireless communication apparatus 300 being a transmission destination. The priority information storage unit 332 stores information for determining the wireless communication apparatus 300 to be a transmission destination of data. Details of the information stored in the priority information storage unit 332 will be described later by using FIG. 5.

Note that, the data acquisition unit 310 or the transmission unit 330 may generate dummy data from data stored in the data storage unit 320, and store the generated dummy data in the dummy data storage unit 334. Further, the wireless communication apparatus 300 may not include the dummy data storage unit 334. In this case, for example, the transmission unit 330 may generate dummy data from data stored in the data storage unit 320, or may use data stored in the data storage unit 320 as dummy data.

FIG. 5 is a diagram illustrating one example of a data configuration of the priority information storage unit 332. The priority information storage unit 332 stores information for connecting to the other wireless communication apparatus 300 that can be a data transmission destination of the wireless communication apparatus 300. In the example illustrated in FIG. 5, the priority information storage unit 332 stores, for each of the plurality of other wireless communication apparatuses 300 that can be a transmission destination of data, information (hereinafter, described as connection information) needed for connecting to the other wireless communication apparatus 300 and information (hereinafter, described as priority information) indicating a priority of the other wireless communication apparatus 300. The number of pieces of the connection information (i.e., the number of the other wireless communication apparatuses 300 that can be a data transmission destination) stored in the priority information storage unit 332 is fewer than the "number−1 of the data output apparatuses 10 constituting the data collection system 1". Further, in the example illustrated in FIG. 5, the priority information storage unit 332 also stores apparatus identification information (apparatus ID) that identifies the wireless communication apparatus 300. However, the priority information storage unit 332 may not store the apparatus identification information.

Figure 6:
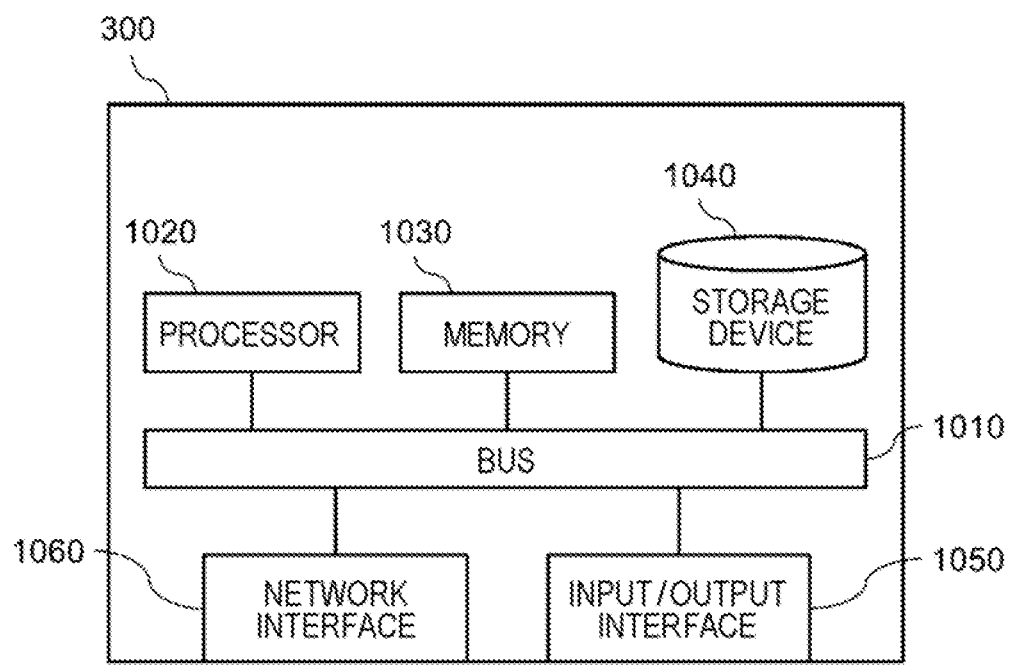
FIG. 6 is a block diagram illustrating a hardware configuration of the wireless communication apparatus.

FIG. 6 is a block diagram illustrating a hardware configuration of the wireless communication apparatus 300. The wireless communication apparatus 300 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method of connecting the processor 1020 and the like to each other is not limited to bus connection.

The processor 1020 is a processor achieved by a central processing unit (CPU), a graphics processing unit (GPU), and the like.

The memory 1030 is a main storage achieved by a random access memory (RAM) and the like.

The storage device 1040 is an auxiliary storages achieved by a hard disk drive (HDD), a solid state drive (SSD), a memory card, a read only memory (ROM), or the like. The storage device 1040 stores a program module that achieves each function (for example, the data acquisition unit 310 and the transmission unit 330) of the wireless communication apparatus 300. The processor 1020 reads each program module onto the memory 1030 and executes the program module, and thereby each function associated with the program module is achieved. Further, the storage device 1040 also functions as the data storage unit 320, the priority information storage unit 332, and the dummy data storage unit 334.

The input/output interface 1050 is an interface for connecting the wireless communication apparatus 300 and various types of input/output equipment.

The network interface 1060 is an interface for connecting the wireless communication apparatus 300 to a network and another apparatus (for example, the relay apparatus 200 and the other wireless communication apparatus 300). The network is, for example, a local area network (LAN) and a wide area network (WAN). A method of connection to the network and the other apparatus by the network interface 1060 may be wireless connection or wired connection.

Figure 7:
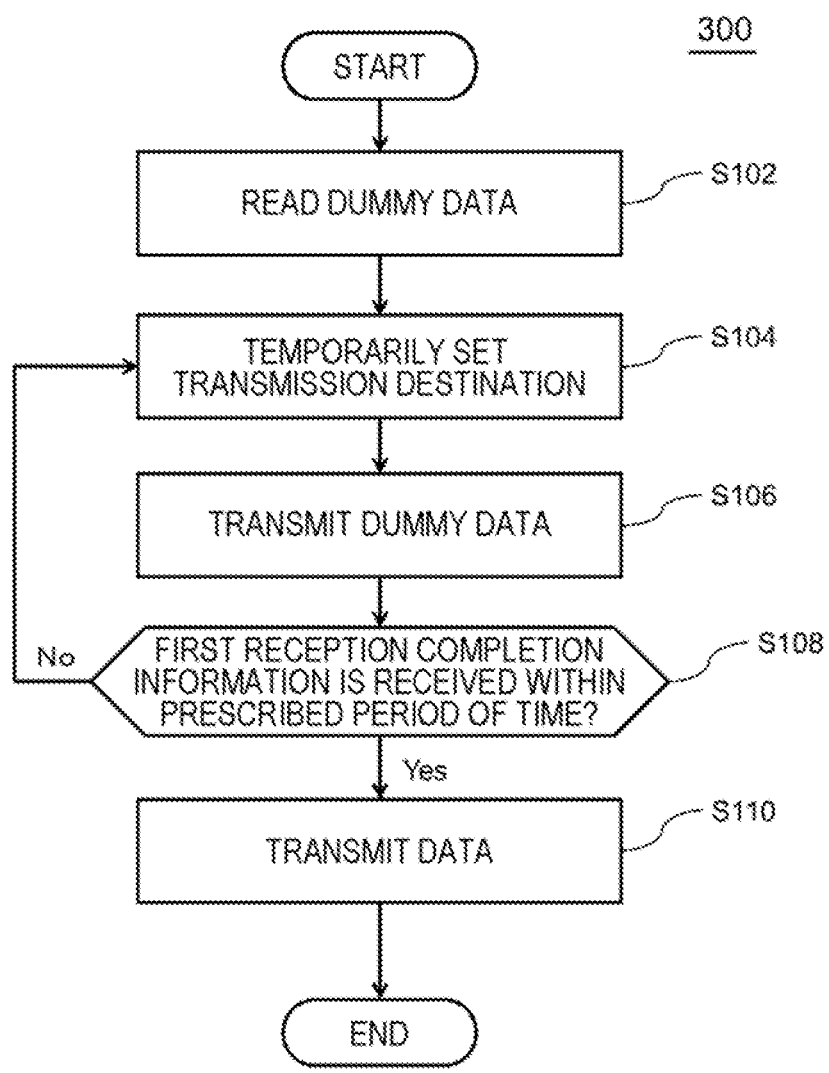
FIG. 7 is a flowchart illustrating an operation example of a transmission unit of the wireless communication apparatus.

FIG. 7 is a flowchart illustrating one example of processing when the wireless communication apparatus 300 transmits data to the wireless communication apparatus 300 closer to the data storage apparatus 20 than the wireless communication apparatus 300. The data transmitted herein are at least either one of data generated by the sensor 100 and data received from the other wireless communication apparatus 300. Then, the wireless communication apparatus 300 transmits, to the other wireless communication apparatus 300 as follows, the data that need to be transmitted.

First, the transmission unit 330 of the wireless communication apparatus 300 reads dummy data from the dummy data storage unit 334 (step S102). Next, the transmission unit 330 reads, from the priority information storage unit 332, connection information about the other wireless communication apparatus 300 having a highest priority. In this way, the wireless communication apparatus 300 temporarily sets a transmission destination (step S104). Next, the wireless communication apparatus 300 transmits the dummy data by using the connection information read in the step S104 (step S106).

When the transmission unit 330 of the wireless communication apparatus 300 being a transmission destination receives the dummy data, the transmission unit 330 transmits information (hereinafter, described as first reception completion information) indicating that reception is completed to the transmission unit 330 being a transmission source.

Then, when the transmission unit 330 receives the first reception completion information within a prescribed period of time since the dummy data have been transmitted (step S108: Yes), the transmission unit 330 sets the temporarily set transmission destination as a formal transmission destination. Then, the wireless communication apparatus 330 transmits data that need to be transmitted by using the connection information read in the step S104 (step S110).

On the other hand, when the transmission unit 330 does not receive the first reception completion information within the prescribed period of time since the dummy data have been transmitted (step S108: No), the transmission unit 330 reads connection information having a second highest priority (step S104), and repeats the processing indicated in the steps S106 and S108. In other words, the transmission unit 330 repeats processing of reading connection information, and performing communication by using the read connection information in descending order of priority until the communication succeeds. In this way, a transmission route of data is set.

Note that, the processing illustrated in FIG. 7 is performed each time the transmission unit 330 transmits data, for example.

As described above, the priority information storage unit 332 of the wireless communication apparatus 300 stores connection information for connecting to the other wireless communication apparatus 300 that can be a data transmission destination of the wireless communication apparatus 300. Then, the transmission unit 330 repeats processing of reading the connection information, and performing communication by using the read connection information in descending order of priority until the communication succeeds. In other words, the transmission unit 330 does not perform broadcast. Thus, with the data collection system 1 being used, when data are collected by multi-hop, the data can be collected even at an occurrence of trouble, and a communication amount at a time of data collection can also be reduced.

Further, the wireless communication apparatus 300 uses dummy data for determining the wireless communication apparatus 300 to be a transmission destination. Then, the wireless communication apparatus 300 transmits, to the wireless communication apparatus 300 to which the dummy data can be transmitted, data that need to be transmitted (for example, data generated by the sensor 100 or data received from the other wireless communication apparatus 300). Therefore, there is a high probability that the data that need to be transmitted can be transmitted to the data storage apparatus 20.

Further, the relay apparatus 200 is provided between the sensor 100 and the wireless communication apparatus 300. The relay apparatus 200 processes data output from the sensor 100, and then outputs the processed data to the wireless communication apparatus 300. Thus, even when the sensor 100 and the wireless communication apparatus 300 are located away from each other, a decrease in S/N ratio of data when reaching the wireless communication apparatus 300 can be suppressed.

Second Example Embodiment

A data collection system 1 according to the present example embodiment has a configuration similar to that of the data collection system 1 according to the first example embodiment except for a point described below.

First, a transmission unit 330 changes a wireless communication apparatus 300 to be a transmission destination according to a volume of data that need to be transmitted. To do so, the transmission unit 330 uses dummy data in response to the volume of the data that need to be transmitted. In other words, the transmission unit 330 determines a transmission route associated with a first data volume by using a transmission result of first dummy data having the first data volume, and determines a transmission route associated with a second data volume by using a transmission result of second dummy data having the second data volume.

To do so, a dummy data storage unit 334 of the wireless communication apparatus 300 stores a plurality of pieces of dummy data having different capacities in association with a range of a data volume in which the dummy data need to be used.

Figure 8:
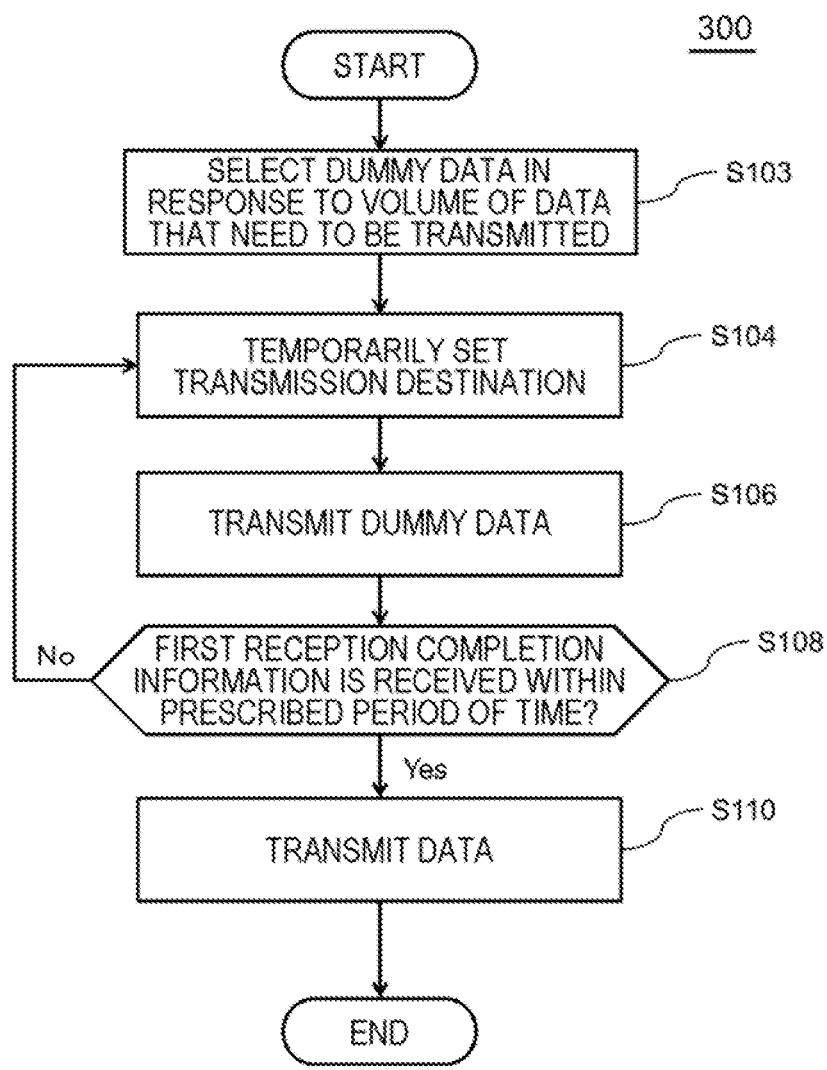
FIG. 8 is a flowchart illustrating an operation example of a transmission unit of a wireless communication apparatus according to a second example embodiment.

FIG. 8 is a flowchart illustrating an operation example of the transmission unit 330 according to the present example embodiment. First, the transmission unit 330 ascertains a volume of data that need to be transmitted. Then, the transmission unit 330 reads dummy data associated with the ascertained volume from the dummy data storage unit 334 (step S103). The subsequent processing (steps S104 to S110) is as described by using FIG. 7.

According to the present example embodiment, the transmission unit 330 of the wireless communication apparatus 300 uses dummy data in response to a volume of data that need to be transmitted. Therefore, the data collection system 1 can set a transmission route in response to the volume of the data that need to be transmitted.

Third Example Embodiment

In a data collection system 1 according to the present example embodiment, a data output apparatus 10 has a configuration similar to that of the data output apparatus 10 according to the first example embodiment except for a point that a volume of data is adjusted in response to time since the data are output until the data reach a data storage apparatus 20.

In the present example embodiment, when the data storage apparatus 20 receives data, the data storage apparatus 20 transmits, toward the data output apparatus 10 that generates the data, information (hereinafter, described as second reception completion information) indicating that the data are received. The second reception completion information may include a date and time (hereinafter, described as a reception time) at which the data storage apparatus 20 receives data. The transmission may be performed by multi-hop, or may be performed in an opposite direction of a route in which the data are transmitted. In the latter case, for example, a transmission unit 330 of a wireless communication apparatus 300 transmits, in association with information (hereinafter, described as route determination information) that determines the transmission unit 330, data to be transmitted. Then, the second reception completion information is transmitted by using the route determination information associated with the transmitted data.

Figure 9:
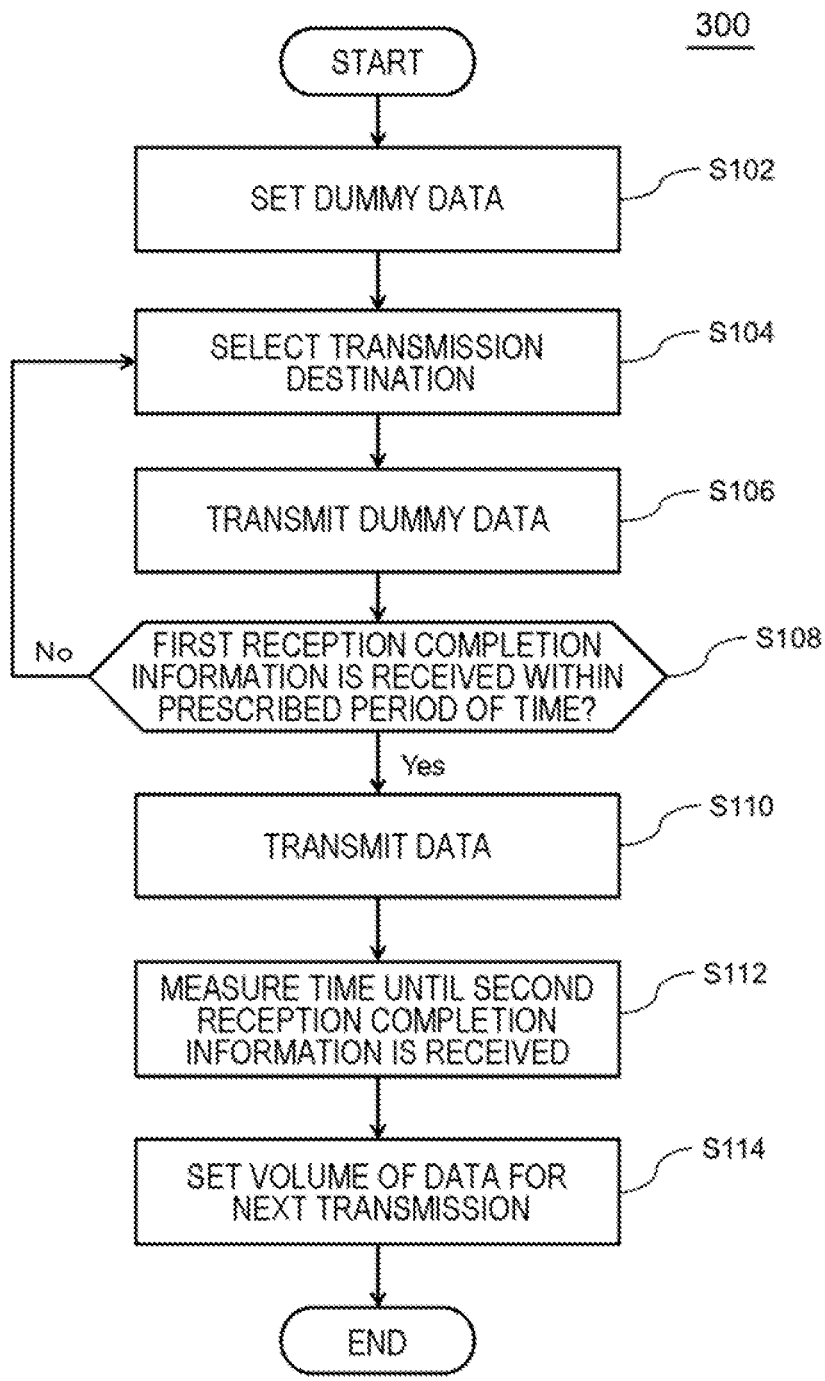
FIG. 9 is a flowchart illustrating an operation example of a transmission unit of a wireless communication apparatus according to a third example embodiment.

FIG. 9 is a flowchart illustrating an operation example of the transmission unit 330 according to the present example embodiment. The processing indicated in steps S102 to S108 is as described in FIG. 7. Note that, the processing indicated in step S103 in FIG. 8 may be performed instead of the processing indicated in step S102.

When the data storage apparatus 20 receives data, the data storage apparatus 20 transmits second reception completion information toward the data output apparatus 10 that generates the data. Then, the transmission unit 330 measures time since the data are transmitted until the second reception completion information is received. Note that, when the second reception completion information includes a reception time of the data storage apparatus 20, the wireless communication apparatus 300 may compute time since the data are transmitted until the reception time (step S112). Then, the transmission unit 330 adjusts, in response to the time, a volume of data when data are transmitted next (step S114). For example, the transmission unit 330 gradually reduces the volume of the data as the time measured in the step S112 increases.

There are various methods of adjusting a volume of data, and, for example, a method of adjusting a measurement time of a sensor 100 or a method of adjusting a sampling rate of data, which is described in the first example embodiment, is conceivable. Further, when the sensor 100 is a multi-axial vibration sensor, the transmission unit 330 can also adjust a volume of data by adjusting the number of axial directions to be included in the data.

As described above, according to the present example embodiment, the transmission unit 330 adjusts a volume of data when data are transmitted next in response to time since the data are transmitted until a reply (second reception completion information) from the data output apparatus 10 is received. Therefore, an increase more than necessary in time until data reach the data storage apparatus 20 can be suppressed.

Fourth Example Embodiment

Figure 10:
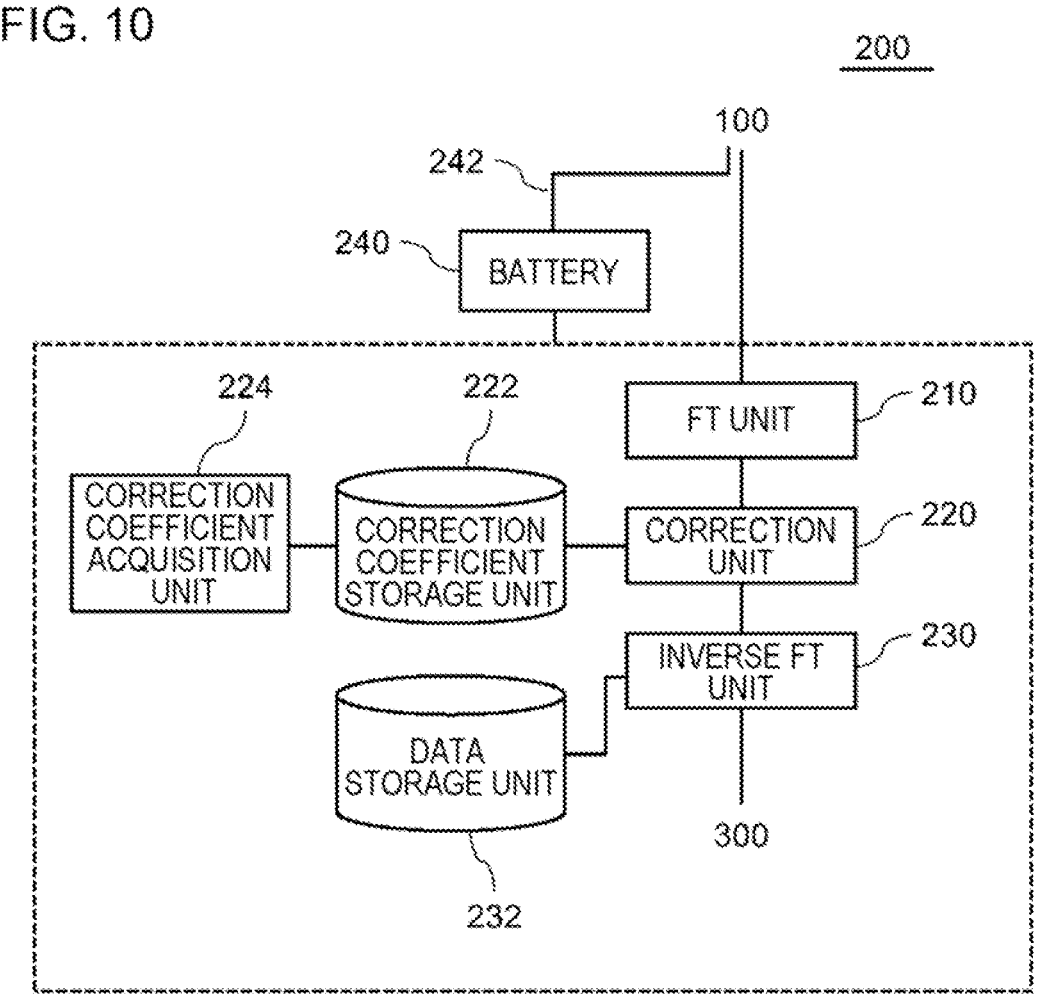
FIG. 10 is a diagram illustrating a functional configuration of a relay apparatus according to a fourth example embodiment.

FIG. 10 is a diagram illustrating a functional configuration of a relay apparatus 200 of a data collection system 1 according to the present example embodiment. The data collection system 1 according to the present example embodiment is similar to the data collection system 1 according to any of the example embodiments described above except for a point that the relay apparatus 200 includes a battery 240 and a terminal 242.

The battery 240 supplies power to another portion of the relay apparatus 200, and also supplies power to an outside via the terminal 242. The terminal 242 supplies power to a sensor 100 via a power line included in a first cable 410.

For example, when the relay apparatus 200 is supplied with power from the outside, a part of the power is conceivably supplied to the sensor 100 via the power line included in the first cable 410. When the supply of the power from the outside is stopped, the sensor 100 cannot generate data. In contrast, according to the present example embodiment, when the supply of the power to the relay apparatus 200 is stopped, the battery 240 supplies data to another portion of the relay apparatus 200 and the sensor 100. Therefore, the sensor 100 can generate data, and can also store, in a data storage unit 232, the data generated by the sensor 100.

While the example embodiments of the present invention have been described with reference to the drawings, the example embodiments are only exemplification of the present invention, and various configurations other than the above-described example embodiments can also be employed.

Further, the plurality of steps (processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. A data collection system, including:
    a plurality of data output apparatuses that are installed at places different from each other, and each output data in wireless communication; and
    a data storage apparatus that stores the data output from the plurality of data output apparatuses, in which
    each of the plurality of data output apparatuses includes
        at least one sensor that generates the data, and
        a wireless communication apparatus that transmits the data toward the data storage apparatus, and
    the wireless communication apparatus
        stores, for each of the plurality of other wireless communication apparatuses that can be a transmission destination of the data, connection information for connecting to the other wireless communication apparatus and priority information indicating a priority of the other wireless communication apparatus, and
        repeats processing of reading the connection information, and performing communication by using the read connection information in descending order of the priority until the communication succeeds when a transmission route of the data is set.
2. The data collection system according to supplementary note 1, in which
    the plurality of data output apparatuses are installed in a factory or a power plant.
3. The data collection system according to supplementary note 1 or 2, in which
    the data output apparatus transmits dummy data at a time of communication for setting a transmission route of the data.
4. The data collection system according to supplementary note 3, in which
    the wireless communication apparatus of the data output apparatus
        determines the transmission route associated with a first data volume by using a transmission result of first dummy data having the first data volume, and
        determines the transmission route associated with a second data volume by using a transmission result of second dummy data having the second data volume.
5. The data collection system according to any one of supplementary notes 1 to 4, in which
    the data output apparatus adjusts a volume of the data in response to time since the data are output until the data reach the data storage apparatus.
6. The data collection system according to supplementary note 5, in which
    the data output apparatus adjusts a volume of the data by adjusting a measurement time of the sensor when one piece of the data is generated.
7. The data collection system according to supplementary note 5, in which the data output apparatus adjusts a volume of the data by adjusting a sampling rate for covering analog data output from the sensor into digital data.
8. The data collection system according to supplementary note 5, in which
the sensor is a vibration sensor that detects vibration in each of a plurality of directions, and
the data output apparatus adjusts a volume of the data by adjusting a number of the directions to be included in the data.
9. The data collection system according to supplementary note 5, in which
the data output apparatus includes a plurality of the sensors, and adjusts a volume of the data by adjusting a number of the sensors that generate the data.
10. The data collection system according to any one of supplementary notes 1 to 9, in which,
in at least one of the data output apparatuses, a band in the wireless communication when the data are received is different from a band in the wireless communication when the data are transmitted.
11. A data output apparatus that outputs the data in wireless communication, and is used in a state of a plurality of the data output apparatuses being installed at places different from each other, the data output apparatus including:
at least one sensor that generates the data; and
a wireless communication apparatus that transmits the data toward a data storage apparatus, in which
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and performing communication by using the read connection information in descending order of the priority until the communication succeeds when a transmission route of the data is set.
12. The data output apparatus according to supplementary note 11, in which the data output apparatus is installed in a factory or a power plant.
13. The data output apparatus according to supplementary note 11 or 12, in which the data output apparatus transmits dummy data at a time of communication for setting a transmission route of the data.
14. The data output apparatus according to supplementary note 13, in which
the wireless communication apparatus
determines the transmission route associated with a first data volume by using a transmission result of first dummy data having the first data volume, and
determines the transmission route associated with a second data volume by using a transmission result of second dummy data having the second data volume.
15. The data output apparatus according to any one of supplementary notes 11 to 14, in which the data output apparatus
adjusts a volume of the data in response to time since the data are output until the data reach the data storage apparatus.
16. The data output apparatus according to supplementary note 15, in which the data output apparatus
adjusts a volume of the data by adjusting a measurement time of the sensor when one piece of the data is generated.
17. The data output apparatus according to supplementary note 15, in which the data output apparatus
adjusts a volume of the data by adjusting a sampling rate when analog data output from the sensor are converted into digital data.
18. The data output apparatus according to supplementary note 15, in which
the sensor is a vibration sensor that detects vibration in each of a plurality of directions, and the data output apparatus adjusts a volume of the data by adjusting a number of the directions to be included in the data.
19. The data output apparatus according to supplementary note 15, further including:
a plurality of the sensors, in which
the data output apparatus adjusts a volume of the data by adjusting a number of the sensors that generate the data.
20. The data output apparatus according to any one of supplementary notes 11 to 19, in which
a band in the wireless communication when the data are received is different from a band in the wireless communication when the data are transmitted.
21. A data collection method including using a data collection system, the data collection system including:
a plurality of data output apparatuses that are installed at places different from each other, and each output data in wireless communication, and
a data storage apparatus that stores the data output from the plurality of data output apparatuses, in which
each of the plurality of data output apparatuses includes
at least one sensor that generates the data, and
a wireless communication apparatus that transmits the data toward the data storage apparatus, and
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and performing communication by using the read connection information in descending order of the priority until the communication succeeds when a transmission route of the data is set.
22. The data collection method according to supplementary note 21, in which
the plurality of data output apparatuses are installed in a factory or a power plant.
23. The data collection method according to supplementary note 21 or 22, in which
the data output apparatus transmits dummy data at a time of communication for setting a transmission route of the data.
24. The data collection method according to supplementary note 23, in which
the wireless communication apparatus of the data output apparatus determines the transmission route associated with a first data volume by using a transmission result of first dummy data having the first data volume, and determines the transmission route associated with a second data volume by using a transmission result of second dummy data having the second data volume.

25. The data collection method according to any one of supplementary notes 21 to 24, in which
the data output apparatus adjusts a volume of the data in response to time since the data are output until the data reach the data storage apparatus.
26. The data collection method according to supplementary note 25, in which
the data output apparatus adjusts a volume of the data by adjusting a measurement time of the sensor when one piece of the data is generated.
27. The data collection method according to supplementary note 25, in which
the data output apparatus adjusts a volume of the data by adjusting a sampling rate when analog data output from the sensor are converted into digital data.
28. The data collection method according to supplementary note 25, in which
the sensor is a vibration sensor that detects vibration in each of a plurality of directions, and
the data output apparatus adjusts a volume of the data by adjusting a number of the directions to be included in the data.
29. The data collection method according to supplementary note 25, in which
the data output apparatus includes a plurality of the sensors, and adjusts a volume of the data by adjusting a number of the sensors that generate the data.
30. The data collection method according to any one of supplementary notes 21 to 29, in which
in at least one of the data output apparatuses, a band in the wireless communication when the data are received is different from a band in the wireless communication when the data are transmitted.

This application is based upon and claims the benefit of priority from Japanese patent application No. 2019-139341, filed on Jul. 30, 2019, the disclosure of which is incorporated herein in its entirety by reference.

REFERENCE SIGNS LIST

1 Data collection system
2 Facility
10 Data output apparatus
20 Data storage apparatus
100 Sensor
200 Relay apparatus
210 Fourier transform unit
220 Correction unit
222 Correction coefficient storage unit
224 Correction computation-week acquisition unit
230 Inverse Fourier transform unit
232 Data storage unit
240 Battery
242 Terminal
300 Wireless communication apparatus
310 Data acquisition unit
320 Data storage unit
330 Transmission unit
332 Priority information storage unit
334 Dummy data storage unit
410 First cable
420 Second cable

What is claimed is:
1. A data collection system, comprising:
a plurality of data output apparatuses that are installed at places different from each other, and each output data in wireless communication; and
a data storage apparatus that stores the data output from the plurality of data output apparatuses, wherein
each of the plurality of data output apparatuses comprises at least one sensor that generates the data, and
a wireless communication apparatus that transmits the data toward the data storage apparatus, and
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and performing communication by using the read connection information in descending order of the priority until the communication succeeds when a transmission route of the data is set,
wherein the data output apparatus adjusts a volume of the data to be transmitted in response to time since the data transmitted are output until the data transmitted reach the data storage apparatus, wherein the data output apparatus adjusts the volume of the data by adjusting a measurement time of the sensor when one piece of the data is generated.
2. The data collection system according to claim 1, wherein
the plurality of data output apparatuses are installed in a factory or a power plant.
3. The data collection system according to claim 1, wherein
the data output apparatus transmits dummy data at a time of communication for setting a transmission route of the data.
4. The data collection system according to claim 3, wherein
the wireless communication apparatus of the data output apparatus
determines the transmission route associated with a first data volume by using a transmission result of first dummy data having the first data volume, and
determines the transmission route associated with a second data volume by using a transmission result of second dummy data having the second data volume.
5. The data collection system according to claim 1, wherein,
in at least one of the data output apparatuses, a band in the wireless communication when the data are received is different from a band in the wireless communication when the data are transmitted.
6. A data output apparatus that outputs data in wireless communication, and is used in a state of a plurality of the data output apparatuses being installed at places different from each other, the data output apparatus comprising:
at least one sensor that generates the data; and
a wireless communication apparatus that transmits the data toward a data storage apparatus, wherein
the wireless communication apparatus stores, for each of the plurality of other wireless communication apparatuses that can be a transmission destination of the data, connection information for connecting to the other wireless communication apparatus and priority information indicating a priority of the other wireless communication apparatus, and repeats processing of reading the connection information, and performing communication by using the read connection information in descending order of the priority until the communication succeeds when a transmission route of the data is set, wherein the data output apparatus adjusts a volume of the data to be transmitted in response to time since the data transmitted are output until the data transmitted reach the data storage apparatus, wherein the data output apparatus adjusts the volume of data by adjusting a measurement time of the sensor when one piece of the data is generated.

7. The data output apparatus according to claim 6, wherein the data output apparatus is installed in a factory or a power plant.

8. The data output apparatus according to claim 6, wherein the data output apparatus transmits dummy data at a time of communication for setting a transmission route of the data.

9. The data output apparatus according to claim 6, wherein
the wireless communication apparatus
determines the transmission route associated with a first data volume by using a transmission result of first dummy data having the first data volume, and
determines the transmission route associated with a second data volume by using a transmission result of second dummy data having the second data volume.

10. The data output apparatus according to claim 6, wherein the data output apparatus
adjusts a volume of the data by adjusting a sampling rate when analog data output from the sensor are converted into digital data.

11. The data output apparatus according to claim 6, wherein
the sensor is a vibration sensor that detects vibration in each of a plurality of directions, and the data output apparatus adjusts a volume of the data by adjusting a number of the directions to be included in the data.

12. The data output apparatus according to claim 6, further comprising:
a plurality of the sensors, wherein
the data output apparatus adjusts a volume of the data by adjusting a number of the sensors that generate the data.

13. A data collection method comprising using a data collection system, the data collection system comprising:
a plurality of data output apparatuses that are installed at places different from each other, and each output data in wireless communication, and
a data storage apparatus that stores the data output from the plurality of data output apparatuses, wherein
each of the plurality of data output apparatuses comprises at least one sensor that generates the data, and
a wireless communication apparatus that transmits the data toward the data storage apparatus, and
the wireless communication apparatus
stores, for each of the plurality of other wireless communication apparatuses that can be a transmission destination of the data, connection information for connecting to the other wireless communication apparatus and priority information indicating a priority of the other wireless communication apparatus, and
repeats processing of reading the connection information, and processing communication by using the read connection information in descending order of the priority until the communication succeeds when a transmission route of the data is set,
wherein each of the plurality of data output apparatuses adjusts a volume of the data to be transmitted in response to time since the data transmitted are output until the data transmitted reach the data storage apparatus, wherein the data output apparatus adjusts the volume of data by adjusting a measurement time of the sensor when one piece of the data is generated.

* * * * *